(12) United States Patent
Fielding

(10) Patent No.: US 6,276,801 B1
(45) Date of Patent: *Aug. 21, 2001

(54) DISPLAY SYSTEM

(75) Inventor: Raymond G. Fielding, Oldham (GB)

(73) Assignee: Digital Projection Limited, Manchester (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/776,805

(22) PCT Filed: Aug. 2, 1995

(86) PCT No.: PCT/GB95/01842

§ 371 Date: Apr. 28, 1997

§ 102(e) Date: Apr. 28, 1997

(87) PCT Pub. No.: WO96/04582

PCT Pub. Date: Feb. 15, 1996

(30) Foreign Application Priority Data

Aug. 4, 1994 (GB) ................................... 9415771
Sep. 19, 1994 (GB) ................................... 9418863

(51) Int. Cl.[7] ................................................. G03B 21/28
(52) U.S. Cl. ............................... 353/31; 348/771; 345/31
(58) Field of Search ............................... 353/20, 30, 31, 353/33, 34, 37, 99, 84; 348/771, 742, 743, 750, 755, 770; 345/31, 32, 108

(56) References Cited

U.S. PATENT DOCUMENTS 3,495,892  2/1970  Dailey ................................... 350/150

(List continued on next page.)

FOREIGN PATENT DOCUMENTS

| 0372905 | 6/1990 | (EP) | H04N/9/31 |
|---|---|---|---|
| 0463500 | 1/1992 | (EP) | H04N/9/31 |
| 0560636 | 9/1993 | (EP) | H04N/9/31 |
| 1363885 | 8/1974 | (GB) | G02F/1/26 |
| 1368598 | 10/1974 | (GB) | G02F/1/26 |
| 2046937 | 11/1980 | (GB) | G02F/1/03 |
| 2252172 | 7/1992 | (GB) | G02F/1/01 |
| 2252173 | 7/1992 | (GB) | G02F/1/01 |
| 4-3041 | 1/1992 | (JP) | G03B/21/00 |
| 6-75541 | 3/1994 | (JP) | G09G/03/36 |
| 88/10545 | 12/1988 | (WO) | H04N/9/31 |
| 92/13424 | 8/1992 | (WO) | H04N/9/31 |
| WO93/20656 | * 10/1993 | (WO) . | |

OTHER PUBLICATIONS

Abstract of JP 4–57045 (E. Karaki), from Patent Abstracts of Japan, vol. 16, No. 251 (P–1366), 1 page, (1992).

*Primary Examiner*—William Dowling
(74) *Attorney, Agent, or Firm*—Michael J. Turton, Esq.; Dean W. Russell, Esq.; Kilpatrick Stockton LLP

(57) ABSTRACT

A projecting display system includes a light source (101) which produces light which is spatially modulated by a number of spatial light modulators (105, 107). A splitting means (103) is provided in the light path between the light source (101) and the spatial light modulators (105 and 107) such that the overall luminous flux produceable by the system is not determined by the maximum luminous flux which each spatial light modultors (105, 107) can accommodate.

6 Claims, 4 Drawing Sheets

U.S. PATENT DOCUMENTS

| | | | |
|---|---|---|---|
| 3,609,381 | 9/1971 | Hartfield | 250/225 |
| 4,864,390 | 9/1989 | McKechnie et al. | 358/60 |
| 5,028,121 | 7/1991 | Baur et al. | 350/351 |
| 5,035,475 | 7/1991 | Lee et al. | 350/6.5 |
| 5,042,921 | 8/1991 | Sato et al. | 359/40 |
| 5,105,299 | 4/1992 | Anderson et al. | 359/223 |
| 5,389,982 * | 2/1995 | Lee | 353/37 |
| 5,420,655 * | 5/1995 | Shimizu | 353/34 |
| 5,442,414 * | 8/1995 | Janssen et al. | 353/98 |
| 5,467,146 * | 11/1995 | Huang et al. | 348/743 |
| 5,486,881 * | 1/1996 | Hwang | 353/31 |
| 5,517,340 * | 5/1996 | Doany et al. | 348/742 |
| 5,552,840 * | 9/1996 | Ishii et al. | 348/751 |
| 5,560,697 * | 10/1996 | Lim et al. | 353/31 |
| 5,592,239 * | 1/1997 | Hara et al. | 348/771 |
| 5,612,753 * | 3/1997 | Poaradish et al. | 348/743 |
| 5,638,142 * | 6/1997 | Kavanagh et al. | 348/756 |
| 5,704,701 * | 1/1998 | Kavanagh et al. | 353/31 |
| 5,815,221 * | 9/1998 | Kojima et al. | 348/751 |

* cited by examiner

DISPLAY SYSTEM

This invention relates to display systems. The invention has particular, although not exclusive, relevance to display systems including a projection system in which light from a light source is modulated by a spatial light modulator device, the modulated light then being projected onto a projection screen.

Spatial light modulator devices suitable for use in such projection systems may take several forms.

One example of a spatial light modulator device is a liquid crystal device comprising a matrix of individually addressable liquid crystal pixels. Such spatial light modulators may act either in a transmissive mode in which the light passes through the pixels of the liquid crystal device, or in a reflective mode in which the light is reflected by each pixel of the liquid crystal device.

Another example of a spatial light modulator device is a deflectable mirror device (DMD) which comprises an array of mirrored cantilever beam structures, each structure carrying an electrode so as to be electrostatically deflectable between two positions. Thus, dependent on the electric field applied to the device, each mirrored structure will reflect an incident light beam into two alternative light paths, either towards an optical system for projection onto a projection screen, or alternatively into a beam dump. Using an array of such structures, each structure being individually addressable by part of the incoming light beam, the incoming light beam can be spatially modulated with a two dimensional image which can then be projected onto the projection screen.

Known projection systems in which light from a light source is modulated by a spatial light modulator device suffer the disadvantage that there is often a limit in the amount of light flux which can be directed onto the spatial light modulator. This limit is caused by, for example limitations associated with the heating effect of the radiant flux, or saturation due to a high luminous flux. Where projection systems are limited in light output, two or more projection systems may be "stacked" by placing the projection systems adjacent to each other such that the projected images are superimposed on the projection screen, producing an overall bright image. However, such an arrangement is both inefficient and space consuming.

U.S. Pat. No. 5,035,475 discloses a display system comprising two spatial light modulators in the form of an array of movable mirrors. Baffles in the form of rows of parallel slits are interposed in the light path between the light source and the two mirror arrays. A beam splitter is effective to split light from the light source between the two mirror arrays, and to recombine light reflected along the normals to the mirror arrays. The baffles are effective to absorb light which is reflected along other directions. By use of the two mirror arrays, the images produced by the two arrays may be interleaved to remove dark stripes in the projected images which are produced by the two baffles. However in such arrangement the flux of the light in the final projected image is still limited by the flux of light produced by each mirror array.

Problems also occur in colour projection systems comprising one or more spatial light modulator devices. In order to achieve a colour projection system it is known to split the incoming light by one or more spectral splitting devices, for example, dichroic mirrors into three primary colour channels. An example of such a prior art system is shown in FIG. 1 which is a schematic diagram of an overview of a colour projection system using three spatial light modulators in the form of DMDs.

Referring to FIG. 1, the particular example of a display system to be described is arranged to project a colour image onto a display screen 101. The display system includes a light source 103 arranged such that the beam from the source is directed onto three planar deflectable mirror display devices 105,107,109. described.

Positioned in the light path between the light source 103 and the first deflectable mirror device 105 are two dichroic mirrors 111,113. The first dichroic mirror 111 is designed and angled to reflect blue light onto the second planar deflectable mirror display device 107 and transmit all other incident light. The second dichroic mirror 113 is designed and angled so as to reflect red light onto the third planar deflectable mirror device 109 and transmit the remaining green component of the light from the source 103 onto the first deflectable mirror display device 105.

The three deflectable mirror devices 105,107,109 are arranged to be capable of reflecting the three colour components of the beam from the source 103 so as to direct the spatially modulated beam through a projection lens 115 onto the display screen 101.

However such arrangements do not take account of the fact that the luminous flux of the various spectral components, for example the primary colours red, green and blue within white light, is unequal.

It is an object of the present invention to provide a display device in which the above problems of limited output light are at least alleviated.

According to a first aspect of the present invention there is provided a display system comprising a plurality of spatial light modulators and including extra spatial light modulators designed to increase the total light flux spatially modulated by the modulators.

According to a second aspect of the present invention there is provided a display system comprising: a light source; at least two spatial light modulators; means for splitting light of the same spectral composition from the light source between the spatial light modulators; means for combining spatially modulated light produced by the spatial light modulators; and means for displaying the combined light such that the combined light is of greater light flux than the light produced by any of the spatial light modulators.

According to a third aspect of the present invention there is provided a display system comprising: a multi wave length light source; a plurality of spatial light modulators; wavelength selective means for splitting light of different spectral composition between the spatial light modulators; means for combining spatially modulated light produced by the spatial light modulators; and means for displaying the combined light; wherein there are provided sufficient spatial light modulators to increase the balance of the division of the light flux produced by the light source between the spatial light modulators.

The means for displaying suitably comprising means for projecting the combined light onto a projection screen.

A number of embodiments of the invention will now be described by way of example only with reference to the accompanying figures in which.

Figure 1:
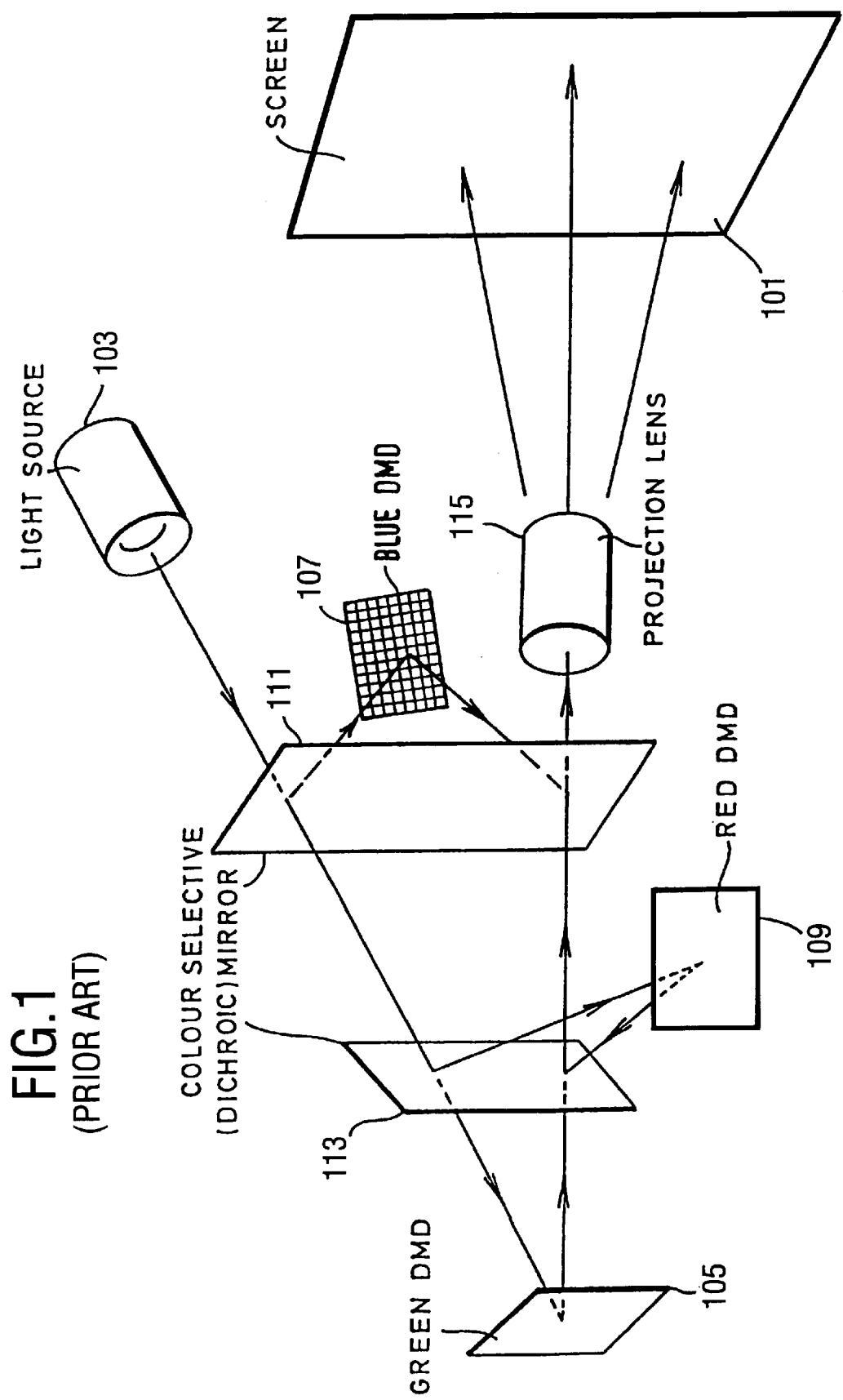
FIG. 1 is a schematic diagram of an overview of a prior art colour projection system as has already been described.
Figure 2:
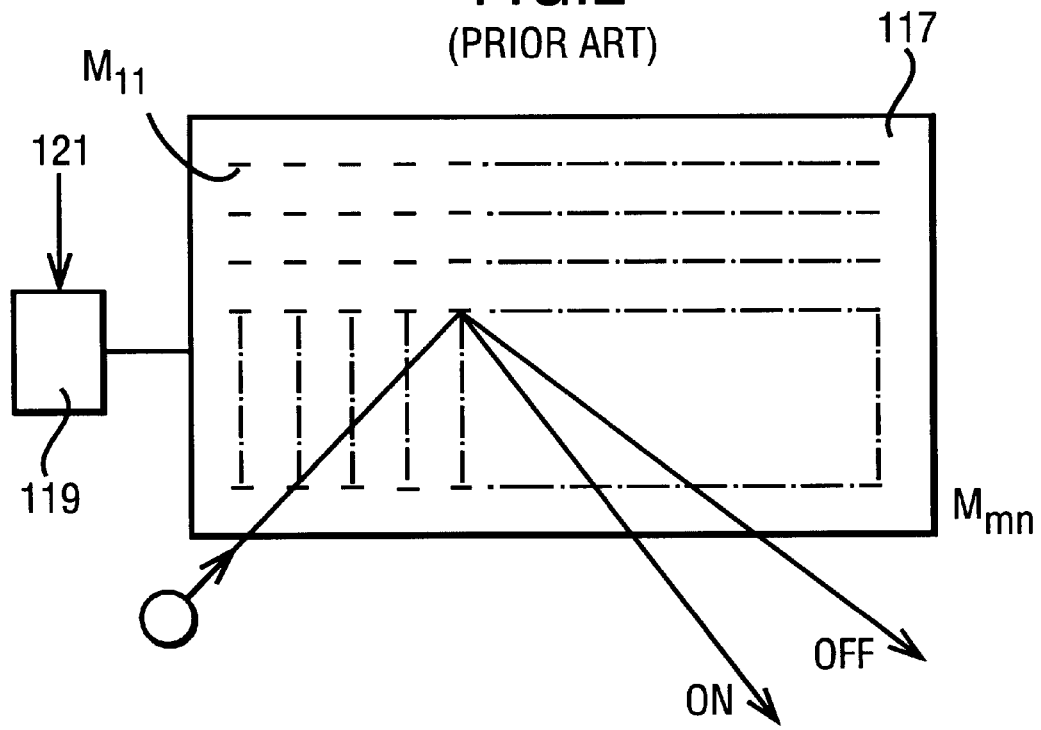
FIG. 2 is a schematic diagram illustrating the operation of a DMD.
Figure 3:
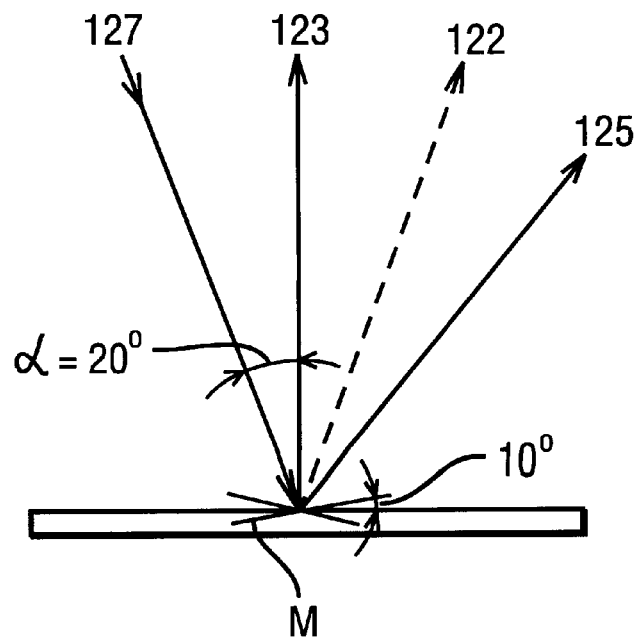
FIG. 3 illustrates the illumination of a mirror device in the array of FIG. 2.

Referring firstly to FIGS. 2 and 3, each deflectable mirror device (DMD), for use in a display system in accordance with an embodiment of the invention comprises an array 117 of m×n deflectable mirror devices, typically 768×576 mirror devices for a low resolution display system or 2048×1152 mirror devices for a high resolution display system. Each array 117 is connected to a driver circuit 119 which receives an electronic colour video signal from the control circuit indicated generally as 121, and addresses each of the mirror devices $M_{ll}$–$M_{mn}$ as, for example, described in the applicant's earlier International Patent Application, PCT/GB92/00002 dated Jan. 4, 1992 (incorporated herein by reference).

Dependent on the applied address signal, each mirror device M is caused to take one of two different positions corresponding to an "on" state in which light reflected from the mirror device M is directed in a first path 123 and an "off" state in which the reflected light is directed in a second path 125. The second path 125 is chosen such that light reflected along this path is directed away from the optical axis of the display system and thus does not pass into the projection lens (not shown in FIGS. 2 and 3).

Thus, each DMD array 117 is capable of representing a two dimensional image, those mirror devices M which are tilted to the "on" state appearing bright and those which are tilted to the "off" state appearing dark. By varying the ratio of the "on" period to "off" period, that is by a temporal modulation technique, grey scale can be achieved.

Turning now particularly to FIG. 3 the angle through which each mirror device M is deflected between the "on" state and the "off" state is relatively small. Thus in order to achieve good discrimination between the "on" and "off" states the incident light beam 127 from the source 103 is directed towards each spatial light modulator 105,107,109 at an angle measured from the normal to each device of around 20°.

When an individual mirror device M is lying parallel to the plane of the array 117, an incident beam 127 from, for example an arc lamp (not shown in FIG. 3) is reflected at a corresponding angle of 20° to the normal along an "off" path 122 into a beam dump (not shown). When the control signal from the driver circuit 119 sets the mirror device M into a first deflection state at a first angle to the plane of the array 117, the incident beam 127 is reflected along the direction 125 in a further "off" path into the beam dump. When the control signal from the addressing circuit 119 sets the mirror device M into a second deflection state at a second angle to the plane of the array 117, the incident beam 127 is reflected out along the normal to the array along the "on" path 123.

Figure 4:
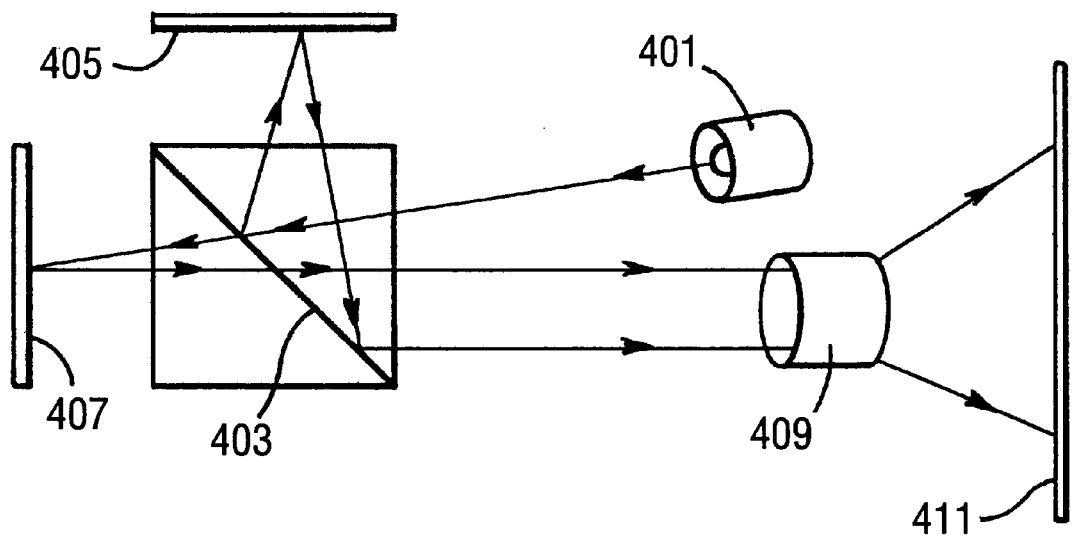
FIG. 4 is a schematic diagram of a display system in accordance with a first embodiment of the invention.

Turning now to FIG. 4, in the first embodiment of the display device in accordance with the invention, a light source 401, for example an arc lamp, is arranged to direct light onto a half silvered mirror 403. The half silvered mirror 103 is effective to split the incident light between two spatial light modulators 405, 407 each in the form of a DMD. Spatially modulated light from the DMDs 405, 407 is recombined at the mirror 403, from which it passes through a projection lens 409 to be projected onto a projection screen 411. The DMDs operate as described in relation to FIGS. 2 and 3 in order to spatially modulate the incoming beam to produce an image for projection screen 411.

It will be seen that by use of the half silvered mirror 403, the light which would in prior art arrangements have been incident on a single DMD is split between the two DMDs 405, 407. Thus the luminous flux incident on the projection screen 411 is twice that which would have been possible using a single DMD as in the prior art arrangements.

It will be appreciated that other forms of light splitters to a half silvered mirror may be used to split the incident light beam between the two DMDs 405,407. One possibility is to replace the half silvered mirror 403 in FIG. 4 by a polarizing beam splitter. The polarizing beam splitter will be effective to split incident light from the light source 401 into P-polarized and S-polarized light. The P-polarized light is directed to one of two DMDs 405, 407 and the S-polarized light is directed towards the other of the DMDs 407 or 405. The polarizing splitter 401 will then recombine the spatially modulated light from the two DMDs 405, 407 for transmission to the projector lens 409.

It will be appreciated that a polarized splitter is more efficient than a half silvered mirror. The optical losses produced by the insertion of such a polarizing splitter will typically be 1–3% of the incident beam compared to the 20–30% losses produced by a mirror surface. However even if a relatively high loss beam splitter is used it is found that a higher light flux projected image may be produced then would otherwise have been possible.

Figure 5:
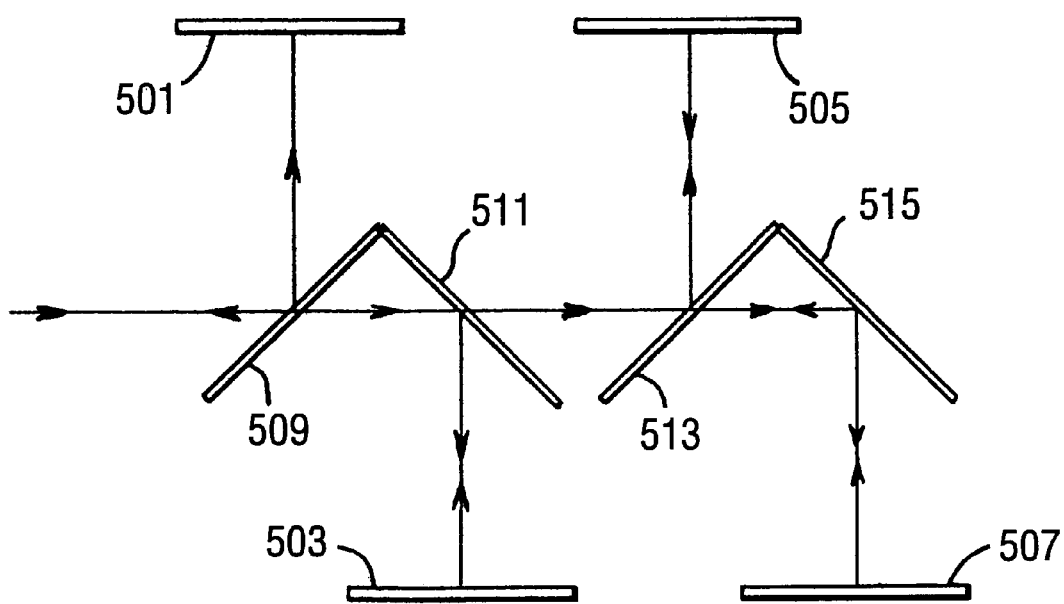
FIG. 5 is a schematic diagram of a display system in accordance with a second embodiment of the invention.

Referring now to FIG. 5, the second embodiment of the invention to be described is a multi-colour projection system. As seen in FIG. 5 the multi colour projection system includes four spatial light modulators in the form of DMDs 501, 503, 505 and 507. Three dichroic mirrors 509, 511 and 513 are arranged in the light path between the DMDs 501,503,505 and 507 and a white light source (not shown). The first dichroic mirror 509 in the light path is arranged to reflect red light onto the DMD 501 and transmit all other light. The second dichroic mirror 511 is arranged to reflect blue light onto the DMD 503 and to transmit the remaining green light. The third dichroic mirror 513 is designed to have a closely controlled band-pass characteristic so as to reflect part of the incident green light with a chosen spectral content onto the third DMD 505 and to transmit the remaining green light onto the fourth spatial light modulator 507.

Each DMD 501, 503, 505 and 507 is driven by address signals as described in relation to FIGS. 2 and 3 to provide an appropriately spatially modulated image in one the primary colours red and blue and the two spectral portions of green. The DMDs 501, 503, 505 and 507 are arranged such that the reflected spatially modulated light is reflected back, and recombined by the various dichroic mirrors 509, 511, 513 to produce a multi-wavelength spatially modulated light beam, which is then arranged to pass back along the optical axis of the system through a projection lens (not shown in FIG. 5) and to be projected onto a projection screen (not shown in FIG. 5).

It will be appreciated that where the spatial light modulators are in the form of a matrix of mirrored surfaces, then a handedness is provided at the reflection at the mirror array which produces the spatially modulated light. This will be compensated for by the subsequent reflection at the appropriate reflective surfaces 509, 511 or 515. In order to provide a compensatory reflective surface for the return light path from the spatial light modulator 507 a reflector 515 is provided the spatial light modulator 507 being positioned accordingly.

It will be appreciated that as in the first embodiment alternative splitters to the dichroic mirror 413 may be used. A particularly efficient way of splitting the green light is to introduce a polarized splitter such that separated P-polarized and S-polarized green light within the same wavelength band is incident on the two spatial light modulators 505 and 507. Alternatively a half-silvered mirror may be used.

It will be appreciated that in the example given before, as white light generally contains more green light than red or blue light, there are two green spatial light modulators. However in some circumstances it may be appropriate to have some other combinations of light modulators which are effective to share the total light flux in convenient proportions amongst the spatial light modulators. For example, as white light typically comprises 30% red light, 60% green light and 10% blue light, the number of spatial light modulators sharing the total light flux in each colour channel can be set according to the light flux in each colour channel. Such an arrangement can be used to improve colour fidelity as well as enhancing light output from the same light input.

It will be appreciated that whilst the second embodiment is described in relation to the splitting of the input light into the primary colours red, blue and green, the invention is equally applicable to the splitting of the input light into the secondary colours yellow, magenta and cyan, or any other colour splitting scheme.

Figure 6:
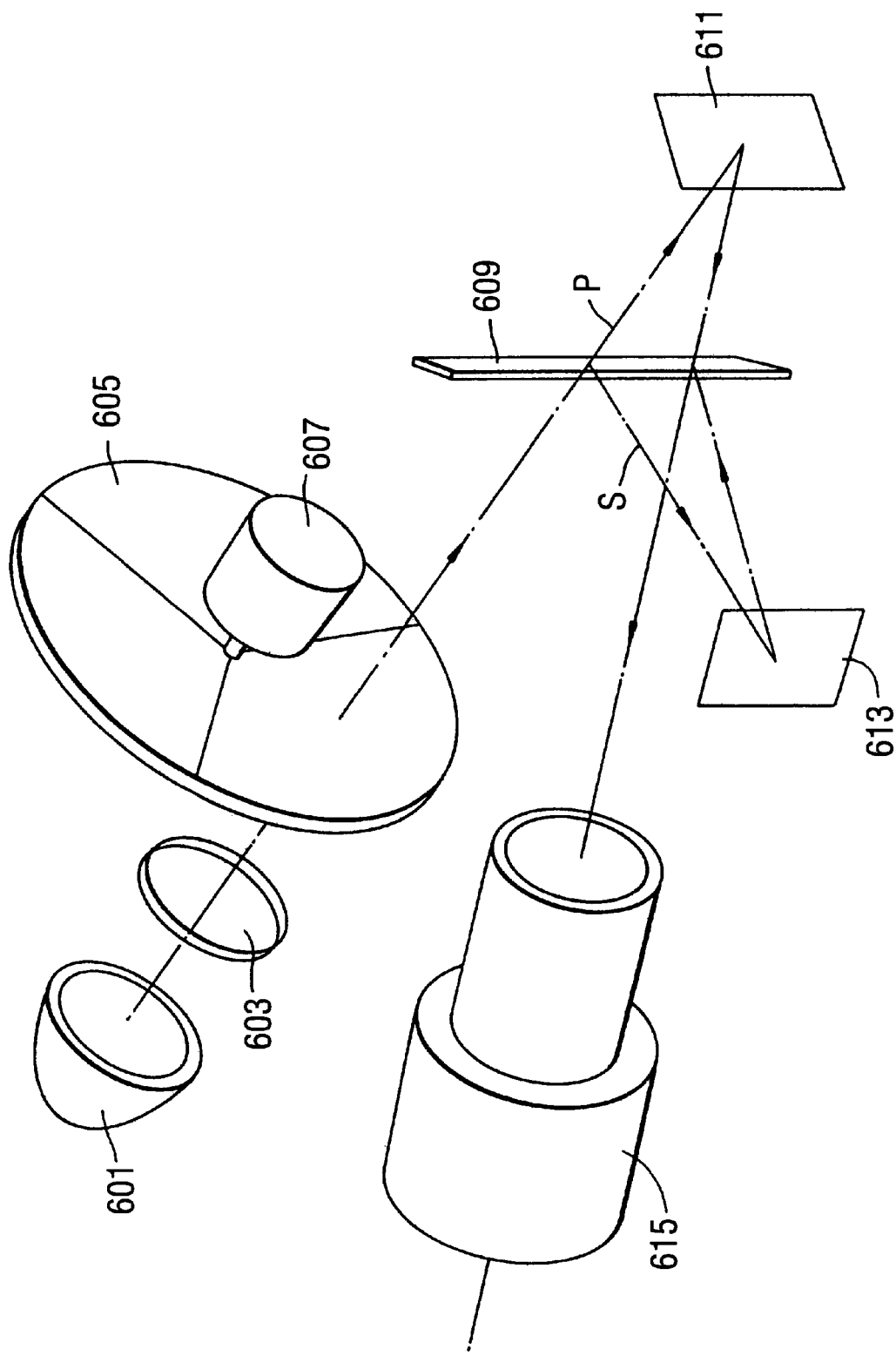
FIG. 6 is a schematic diagram of a display system in accordance with a third embodiment of the invention.

It will be seen that in the embodiment of the invention described in relation to FIG. 5, the input light is split into three different colour components such that the three components are spatially modulated simultaneously. However, in a display system in accordance with the invention, light of different colours may be passed sequentially through the display system. Such an arrangement is shown in FIG. 6 in which light from a light source comprising an arc lamp 601 and a condenser lens 603 is arranged to pass sequentially through different portions of a colour wheel 605 carrying red, blue and green filters. The wheel 605 is rotatable by a motor 607 about a central axis so as to superimpose in sequence, the red, blue and green filters in the light path from the light source 601, 603.

As in the first embodiment described in relation to FIG. 4, a polarizing beam splitter 609 is placed in the light path, the polarizing beam splitter being effective to divide the incident light into P-polarized and S-polarized light components. The P-polarized light is directed towards a first spatial light modulator in the form of a DMD 611, whilst the S-polarized light is directed towards a second spatial light modulator DMD 613.

Spatially modulated light from the spatial light modulators 611, 613 passes back to the beam splitter 609, which re-combines the S and P-polarized light and directs it towards a projection lens 515 for projection onto a projection screen (not shown).

The speed of rotation of the colour wheel 605 is chosen such that the time for light of all three different colour components to pass through the display system and be projected on the projection screen, is short enough such that the eyes of an observer watching the projection screen integrate the three different coloured projected images on the display screen, and a full colour image is seen by the observer.

It will be appreciated that as in the other embodiments described herebefore, whilst the use of a polarized splitter is particularly advantageous, other forms of splitter may be used.

It will also be appreciated that whilst the invention has particular application to display systems using spatial light modulators in the form of DMDs as such system are of ten limited by the flux handling capabilities of the DMDs, the invention is also applicable to display systems including other forms of spatial light modulators, for example liquid crystal devices.

What is claimed is:

1. A display system comprising:
   a multi wavelength light source;
   a plurality of deflectable mirror devices, each device having a plane defined by an array of mirror elements, each mirror element corresponding to a respective pixel of a color image to be displayed and being deflectable between a first orientation relative to said plane of the array effective to reflect light incident on the mirror element at a predetermined angle not normal to the plane of the array along an "ON" path for the device and a second orientation relative to said plane of the array effective to reflect light incident on the mirror element at said predetermined angle along an "OFF" path for the device;
   input circuitry for receiving signals representative of a color image;
   control means for supplying address signals to each device representative of a wavelength band component of said color image and effective to control the orientation of each of the mirror elements of each array between said first and second orientations dependent on said color image, the control means being arranged to supply the same address signals corresponding to at least one of said wavelength band components to at least two of said deflectable mirror devices;
   a wavelength selective means for splitting light from said light source within each of said different wavelength band components of said color image;
   means for further splitting the light in said one wavelength band component between said at least two deflectable mirror devices;
   means for directing the split and further split light in each wavelength band component towards the correspondingly addressed deflectable mirror device; and
   means for combining the light reflected by all of the deflectable mirror devices along the respective "ON" paths for the devices to form a single spatially modulated light beam.

2. A display system according to claim 1 wherein said means for further splitting light comprises at least one polarized splitter effective to split the light incident thereon into P-polarized light and S-polarized light components.

3. A display system according to claim 1 wherein said means for further splitting the light comprises:
   at least one semi-reflective means which is effective to reflect part of the light incident thereon and to transmit the rest of the light incident thereon.

4. A display system according to claim 1 wherein said means for further splitting the light comprises a dichroic means effective to split light within two different narrow wavelength bands within a broad wavelength band including said narrow wavelength bands.

5. A display system according to claim 4 wherein the same wavelength band component is a primary color wavelength band component and said dichroic means is arranged to split light within two different wavelength bands within said primary color band.

6. A display system according to claim 5 in which there are provided at least two spatial light modulators in respect of two different wavelength bands in the green light wavelength band component.

* * * * *